US010678326B2

(12) United States Patent
Chen et al.

(10) Patent No.: US 10,678,326 B2
(45) Date of Patent: Jun. 9, 2020

(54) COMBINING MOBILE DEVICES WITH PEOPLE TRACKING FOR LARGE DISPLAY INTERACTIONS (71) Applicant: Microsoft Technology Licensing, LLC, Redmond, WA (US)

(72) Inventors: Yinpeng Chen, Sammamish, WA (US); Sasa Junuzovic, Kirkland, WA (US); Zhengyou Zhang, Belluevue, WA (US); Zicheng Liu, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 307 days.

(21) Appl. No.: 14/866,534

(22) Filed: Sep. 25, 2015

(65) Prior Publication Data
US 2017/0090560 A1    Mar. 30, 2017

(51) Int. Cl.
  *G09G 1/00*    (2006.01)
  *G06F 3/01*    (2006.01)
  (Continued)

(52) U.S. Cl.
  CPC .............. *G06F 3/013* (2013.01); *G06F 3/011* (2013.01); *G06F 3/017* (2013.01); *G06F 3/0346* (2013.01);
  (Continued)

(58) Field of Classification Search
  CPC ........... G09G 5/00; G06F 3/01; G06F 3/0484; G06F 3/00
  See application file for complete search history.

(56) References Cited

U.S. PATENT DOCUMENTS 5,818,425 A    10/1998 Want et al.
7,432,916 B2    10/2008 Janik
(Continued)

FOREIGN PATENT DOCUMENTS

EP    2521370 A1    11/2012
EP    2869178 A1    5/2015

OTHER PUBLICATIONS

"International Search Report and Written Opinion Issued in PCT Application No. PCT/US2016/052364", dated Nov. 25, 2016, 16 Pages.
(Continued)

*Primary Examiner* — Michael A Faragalla
(74) *Attorney, Agent, or Firm* — Alleman Hall Creasman & Tuttle LLP (57) ABSTRACT

The large display interaction implementations described herein combine mobile devices with people tracking to enable new interactions including making a non-touch-sensitive display touch-sensitive and allowing personalized interactions with the display. One implementation tracks one or more mobile computing device users relative to a large computer-driven display, and configures content displayed on the display based on a distance a given mobile computing device user is from the display. Another implementation personalizes user interactions with a large display. One or more mobile computing device users are tracked relative to a display. The identity of each of the one or more mobile computing device users is obtained. Content displayed on the display is configured based on a distance an identified mobile computing device user is from the display and the identity of the user that provides the content.

22 Claims, 6 Drawing Sheets

(51) Int. Cl.

| | | |
|---|---|---|
| *G06F 3/0346* | (2013.01) | |
| *G06F 3/041* | (2006.01) | |
| *G06K 9/00* | (2006.01) | |
| *G08C 17/00* | (2006.01) | |
| *H04N 21/466* | (2011.01) | |
| *H04N 21/422* | (2011.01) | |
| *H04N 21/414* | (2011.01) | |
| *H04M 1/725* | (2006.01) | |
| *G06F 40/169* | (2020.01) | |

(52) U.S. Cl.
CPC .......... *G06F 3/0416* (2013.01); *G06F 40/169* (2020.01); *G06K 9/00295* (2013.01); *G08C 17/00* (2013.01); *H04M 1/7253* (2013.01); *H04N 21/41415* (2013.01); *H04N 21/42224* (2013.01); *H04N 21/4661* (2013.01); *G06F 2203/0383* (2013.01); *G08C 2201/30* (2013.01); *G08C 2201/32* (2013.01); *G08C 2201/93* (2013.01); *H04M 1/72572* (2013.01)

(56) References Cited

U.S. PATENT DOCUMENTS

| | | | |
|---|---|---|---|
| 8,271,908 B2 | 9/2012 | Li et al. | |
| 8,564,728 B2 | 10/2013 | Petersson et al. | |
| 8,847,909 B2 | 9/2014 | Kolehmainen | |
| 2006/0139314 A1 | 6/2006 | Bell | |
| 2009/0251432 A1 | 10/2009 | Wang et al. | |
| 2010/0261466 A1 | 10/2010 | Chang et al. | |
| 2010/0269072 A1* | 10/2010 | Sakata ................. | G06F 1/1601 715/863 |
| 2011/0214165 A1* | 9/2011 | Jeffreys ............... | G06F 16/2471 726/5 |
| 2012/0081299 A1 | 4/2012 | Xiao et al. | |
| 2012/0146918 A1 | 6/2012 | Kreiner et al. | |
| 2013/0004016 A1* | 1/2013 | Karakotsios ....... | G06K 9/00355 382/103 |
| 2014/0380193 A1 | 12/2014 | Coplen et al. | |
| 2015/0029095 A1 | 1/2015 | Gomez et al. | |
| 2015/0074774 A1* | 3/2015 | Nema .................... | H04L 63/08 726/5 |
| 2015/0169069 A1* | 6/2015 | Lo .......................... | G06F 3/017 715/753 |
| 2016/0026809 A1* | 1/2016 | Edwardson ............ | G06F 21/62 726/4 |
| 2016/0048368 A1* | 2/2016 | McGibney ........... | G06F 3/1454 345/2.3 |

OTHER PUBLICATIONS

Sanneblad, et al. "Ubiquitous Graphics: Combining Hand-Held and Wall-Size Displays to Interact with Large Images", In the Proceedings of the Working Conference on Advanced Visual Interfaces, May 23, 2006, pp. 373-377.

Bauer, et al., "Evaluation of Mobile Phones for Large Display Interaction", In Proceedings of Visualization of Large and Unstructured Data Sets Workshop, Jun. 10, 2011, pp. 103-112.

Bragdon, et al., "Code Space: Touch + Air Guesture Hybrid Interactions for supporting Developers Meetings", In Proceedings ACM Conference on Interactive Tabletops and Surfaces, Nov. 13, 2011, pp. 212-221.

Hutama, et al., "Distinguishing Multiple Smart-Phone Interactions on a Multi-touch Wall Display using Tilt Correlation", In Proceedings of Conference on Human Factors in Computing Systems, May 7, 2011, 4 pages.

Steinert, et al., "Multi-user Multi-account Interaction in Groupware Supporting Single-display Collaboration", In Proceedings of 5th International Conference on Collaborative Computing: Networking, Applications and Worksharing, Nov. 11, 2009, 9 pages.

Zadow, et al., "SleeD: Using a Sleeve Display to Interact with Touch-sensitive Display Walls", In Proceedings ACM Conference on Interactive Tabletops and Surfaces, Nov. 16, 2014, pp. 129-138.

"Second Written Opinion Issued in PCT Application No. PCT/US2016/052364", dated Aug. 11, 2017, 11 Pages.

"Office Action Issued in European Patent Application No. 16781896.2", dated Oct. 31, 2019, 8 Pages.

* cited by examiner

COMBINING MOBILE DEVICES WITH PEOPLE TRACKING FOR LARGE DISPLAY INTERACTIONS

BACKGROUND

Electronic whiteboards or large computer-driven displays have become common in work places and in educational environments. Such large displays are indispensable for sharing ideas between many people. Additionally, sometimes large computer-driven displays are used in teleconferencing facilities. In such applications, the content written on these displays can be recorded, stored and distributed over networks to other displays or computing devices.

Some large computer-driven displays are touch-sensitive. Touch-sensitive displays allow markings made by users to be shown on their touch-sensitive surfaces, and allow controls to be integrated into the display. Touch-sensitive displays, especially in large form, can be very expensive.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The large display interaction implementations described herein combine mobile devices with people tracking to enable new interactions including making a non-touch-sensitive display touch-sensitive and allowing personalized interactions with the display.

One large display interaction implementation described herein provides different user interactions with a large computer-driven display based on how close one or more users are to the display. The display can be a non-touch-sensitive display or a touch-sensitive display. If the large display is a non-touch-sensitive display it can be made to mimic a touch-sensitive display by allowing annotations made by a user to be displayed on its surface. This implementation tracks one or more mobile computing device users (e.g., mobile phone or tablet computing device users) relative to the display, and configures content shown on the display based on a distance a given mobile computing device user is from the display.

Another large display interaction implementation personalizes user interactions with a large display. One or more mobile computing device users are tracked relative to a display, such as, for example, a large non-touch-sensitive display, such as one that might be placed in a meeting room. The identity of each of the one or more mobile computing device users is obtained. Content shown on the display is based on a distance an identified mobile computing device user is from the display and the user's identity.

DESCRIPTION OF THE DRAWINGS

The specific features, aspects, and advantages of the disclosure will become better understood with regard to the following description, appended claims, and accompanying drawings where:

DETAILED DESCRIPTION

In the following description of large display interaction implementations, reference is made to the accompanying drawings, which form a part thereof, and which show by way of illustration examples by which implementations described herein may be practiced. It is to be understood that other embodiments may be utilized and structural changes may be made without departing from the scope of the claimed subject matter.

1.0 Large Display Interaction Implementations

The following sections provide an overview of large display interaction implementations described herein, as well as systems and processes for practicing these implementations.

As a preliminary matter, some of the figures that follow describe concepts in the context of one or more structural components, variously referred to as functionality, modules, features, elements, etc. The various components shown in the figures can be implemented in any manner. In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect-different functions performed by a single actual component.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner.

1.1 Overview

Figure 1:
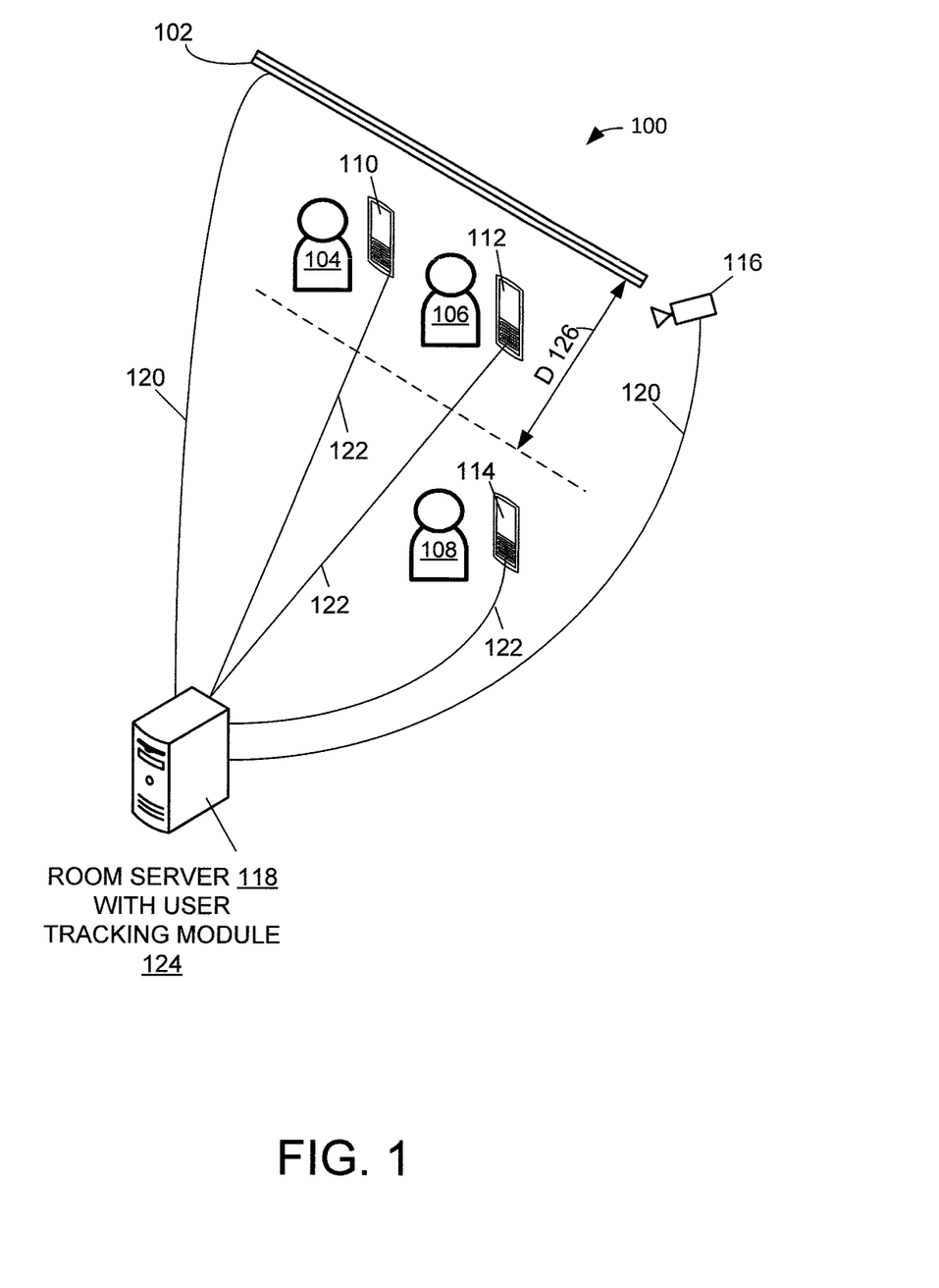
FIG. 1 is an exemplary environment in which various exemplary large display interaction implementations can be practiced.

FIG. 1 shows an exemplary environment 100 for practicing various large display interaction implementations as described herein. The environment includes a large display 102, one or more people 104, 106, 108, each with a mobile computing device 110, 112, 114 such as, for example, a smart phone or tablet computing device. The system 100 also includes one or more cameras or vision sensors 116. Both the camera(s) 116 and the display 102 are connected to one or more computers, herein called a room server 118, either directly or via a wired or wireless network 120. Furthermore, the mobile computing devices 110, 112, 114 are connected to the room server 118 over a wireless network 122 (e.g., through WiFi or Bluetooth).

In some implementations, for each mobile computing device 110, 112, 114, the room server 118 can determine the specific identity of the owner 104, 106, 108. For example, the owner/user 104, 106, 108 of each mobile computing device 110, 112, 114 can register their device along with their identity on the room server 118. Alternately, in some implementations, the room server 118 can determine the identity of the user in a general manner, for example, by determining a general identity, such as, for example, User1, User2 and User3. This can be done, for example, by tracking and correlating user hand motion (e.g., via user tracking module 124) with information from each mobile device's inertial system to determine which user is associated with which mobile computing device. These implementations are advantageous because there is no need for each user to register their mobile computing device 110, 112, 114 with the room server 118. If specific user identification is desired, it can be retrieved from the mobile device the user is holding. Furthermore, multiple users are able to use a single mobile device 110, 112, 114 in implementations where users' general identity is obtained. For example, if one user passes a mobile computing device to another user, the room server 118 can correlate inertial (or other sensor) information received from the mobile computing device with the user's motions received from the user tracking module 124 to determine which user the mobile computing device is associated with. Appropriate commands can then be sent to, or received from, the user's mobile computing device or the large display 102.

The user tracking module 124 that runs on, or in conjunction with, the room server 118 performs user tracking. In some implementations the user tracking module 124 can also perform user recognition. Hence, at any time instance, the tracking module 124 can output the number of people (e.g., mobile device users) in the scene, possibly the identity of each person, the hand positions of each person relative to the display, and so forth, to the room server 118.

The user tracking module 124 allows for the pairing of the mobile devices 110, 112,114 with the users 104, 106, 108. When there is a touch event on a mobile device 110, 112, 114 (e.g., a mobile computing device is touched in a prescribed manner or a control on the mobile device is activated) the room server 118 knows whose mobile device (e.g., tablet, phone) is touched. From the tracking information, it knows where the user (who possesses the mobile device) is as well as his/her hand position with respect to the large display. By combining the mobile computing device's touch sensing with the user tracking, touch interactions can be simulated on a non-touch display. Such a non-touch display can be a large display 102, as shown in FIG. 1, or can be another type of display. In some implementations the user tracking module 124 can also include a user recognition component that can recognize the identity of a specific user (e.g., via face recognition or body recognition).

When a user 104, 106, 108 of a mobile device 110, 112, 114 is standing in front of the large display 102, the room server 118 obtains the position of the user's hand that is drawing on the large display 102 (e.g., by using the cameras 116 and the user tracking module 124, that determine whether the hand is within a prescribed distance from the large display 102). Whenever there is a touch event on the mobile computing device 110, 112, 114 (e.g., whenever the mobile device user touches his or her mobile device in a prescribed manner or activates a control on it), the touch event is sent to the room server 118. The room server 118 then checks the hand position of the user 104, 106, 108 who owns the device 110, 112, 114. (The hand position is received and tracked using the user tracking module 124.) If the hand position is close to the large display 102 (e.g., within a prescribed distance D 126), the room server 118 will issue a stroke-drawing command to the large display 102 and the large display will show the stroke made by the user's gestures which are tracked by the user tracking module 124. In this way, the user 110, 112, 114 can write strokes on the large display 102 as if the large display 102 were touch-sensitive. This is useful, for example, when a presenter wants to highlight information on a slide presented on the large display 102. It is not necessary for the user 104, 106, 108 to hold the mobile computing device 110, 112, 114 as long as the mobile computing device 110, 112, 114 is on the user's person, since the user tracking module 124 is used to track the user's hand gestures when the user 104, 106, 108 is within a prescribed distance 126 from the large display 102.

The same mechanism can be used to enter text. If the user is within a prescribed distance 126 from the display 102, the user 104, 106, 108 can use his/her mobile computing device 110, 112, 114 to type text, and then click on a special "copy" button (for example, on the user interface of the mobile computing device or a virtual button on the display). The same text as entered into the mobile computing device will show up on the large display at the hand position. In one implementation, when the special "copy" button is clicked, the mobile computing device 110, 112, 114 sends the event indicating the copy button was activated together with the text to the room server 118. The room server 118 obtains the position of the user's hand (the user associated with the mobile computing device). The room server 118 then displays the text on the large display 102 near the user's hand position (e.g., within a prescribed distance of the user's hand).

If there are (virtual) buttons on the large display 102, the user can use their mobile computing device to select and click on these buttons by moving the mobile computing device 110, 112, 114 over the button on the display 102 and clicking on the mobile computing device. A touch event on the mobile computing device 110, 112, 114 and the position of the hand are combined to trigger a "button click" event on the large display 102 that can be used to control the display or other device.

In summary, when a user is within a prescribed distance from the display, the mobile computing device provides touch events while the tracking module 124 provides the position. By combining them, any touch interactions can be simulated.

If the given user 104, 106, 108 is further than a prescribed distance 126 from the display 102 the user interface of the user's mobile computing device changes to reflect different capabilities that can be used by a user that is not close to the display. For example, if the user 104, 106, 108 is within a prescribed distance 126 from the display 102 the user interface will be configured to allow the user to annotate the display, while if the user if further than the prescribed distance the user interface will be configured to point to the display.

In one implementation, a "relative pointing" is used. When a user 104, 106, 108 wishes to point to something shown on the display 102 he/she presses a "point" button (or other control) on his or her mobile computing device 110, 112, 114, and a dot (or other type of cursor) is drawn at the center of the large display 102. After that, the user 104, 106, 108 keeps pressing the button, and the rotations of the device 110, 112, 114 are converted to the relative movements of the "dot" on the display. Finally, the user 104, 106, 108 releases the button and the dot disappears from the display 102.

In another implementation, "absolute pointing" is performed. The room server 118 estimates the intended pointing direction from the user's 104, 106, 108 arm and hand positions. When the user 104, 106, 108 presses the "point" button (or other control) on his or her mobile computing device, a dot is drawn at the intersection of the pointing direction with the display.

In some implementations, as discussed previously, the room server 118 knows the identity of the user in either a specific or generalized manner (e.g., User1, User2). In such implementations, personalized interactions can be enabled. For example, each person can have his/her own stroke color, font, font size, thickness, and/or other attribute that distinguishes that person from the other users. For example, two people can write on the display at the same time each with a different color. Multiple people can use their mobile computing devices to point to the display simultaneously, each with a different colored pointer.

The large display interaction implementations discussed herein are very advantageous in that they allow a non-touch computer driven display to appear as a touch-sensitive display. This provides cost-saving benefits and obviates the need for specialized hardware. Furthermore, some large display interaction implementations described herein allow information displayed for each user to be personalized so that information provided by each user on a large display can be attributed to them, making the information displayed more coherent and easier to understand. Such personalized information can be recorded and used at a later date so that users can better use the information displayed on the display. Additionally, in some implementations, the identity of a user can be retrieved from a mobile computing device only when needed. This obviates the need for registration of users. In some implementations this can also allow a single mobile computing device to be used by multiple users.

2.0 Exemplary Systems and Processes for Large Display Interaction Implementations An overview of the large display interaction implementations having been provided, the following sections described some exemplary systems and processes for practicing various large display interaction implementations.

2.1 Exemplary Systems

Figure 2:
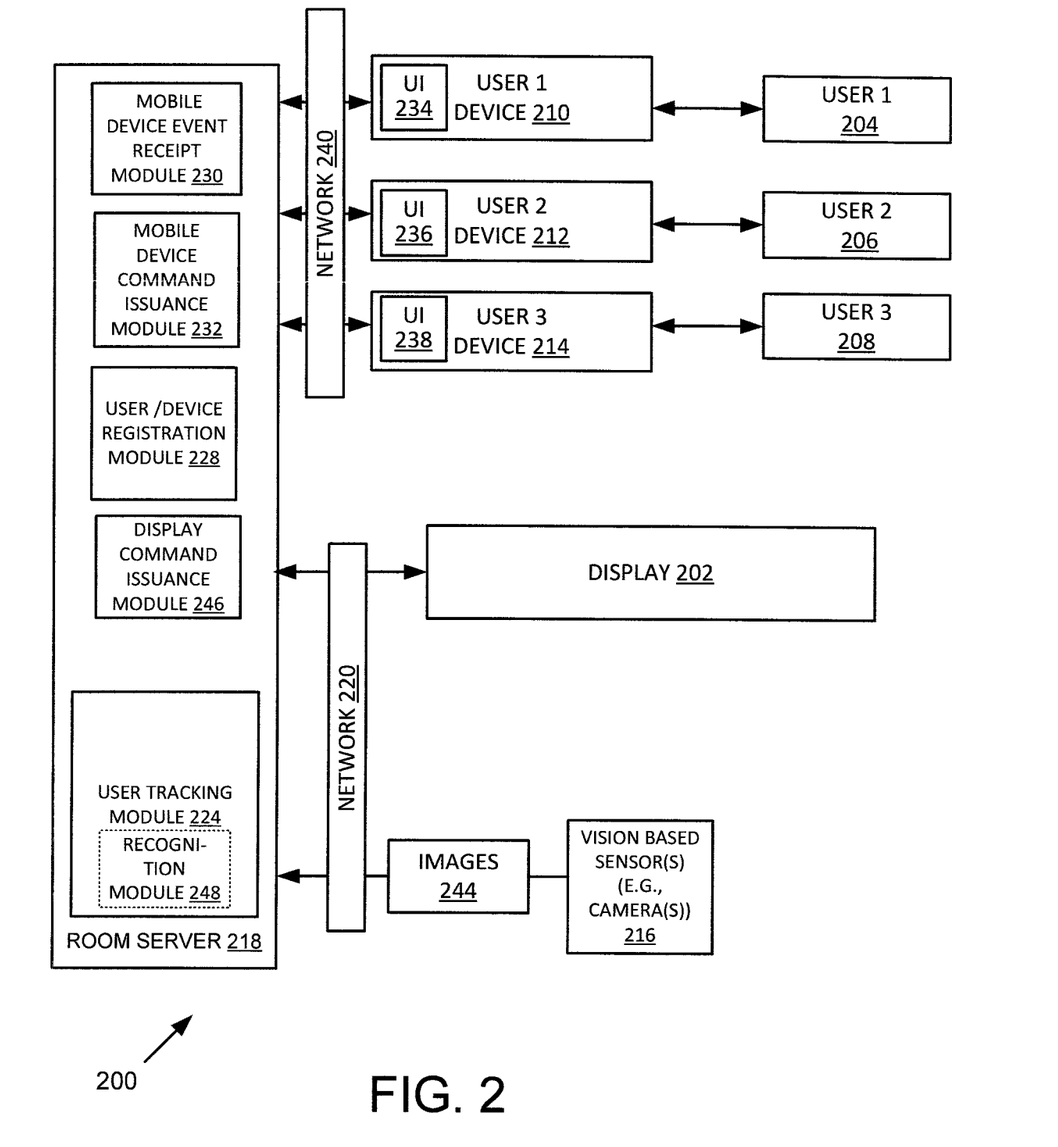
FIG. 2 is an exemplary block diagram of a system for practicing various large display interaction implementations as described herein.

FIG. 2 shows an exemplary system 200 for practicing various large display interaction implementations. The system 200 includes a large computer-driven display 202 and one or more users 204, 206, 208 each with a mobile computing device 210, 212, 214 (such as, for example, a smart phone or a tablet computing device). One or more cameras or vision-based sensors 216 are used to capture images 244 of the display 202 and the users 204, 206, 208 in order to track the users and measure the distance between each user and the display 202 in order to determine if any of the users 204, 206, 208 are within (or outside of) a prescribed distance from the display. Even though Microsoft Corporation's Kinect® devices are used in some large display interaction implementations, any other image sensors such as conventional red, green, blue (RGB) cameras, infrared sensors, red, green blue infrared (RGBIR) cameras, and depth sensors may be used as long as they have image sensors for people tracking and identification.

Both the camera(s) 216 and the display 202 are connected to one or more computers, herein called a room server 218, by a wired or wireless network 220. The room server 218 and the mobile computing devices 210, 212, 214 can each be a computing device as discussed in greater detail with respect to FIG. 6. Furthermore, all the mobile computing devices 210, 212, 214 are also connected to the room server 218 via a wireless network 222 (e.g., Blue-tooth, WiFi).

In some implementations, for each mobile computing device 210, 212, 214, the room server 218 knows the identity of the owner/user 204, 206, 208 in either a specific or a generalized manner. For example, in some implementations, a registration module 228, which in some implementations is located on the room server 218, is used to register the name of each user 204, 206, 208 with their mobile computing device 210, 212, 214. In some large display interaction implementations, the identity of each user is not explicitly registered but is inferred, for example, by tracking a user's hand and correlating hand motion with information from each mobile computing device's sensor or inertial information to determine which user is in possession of the mobile computing device.

A user tracking module 224 that runs on the room server 218, or in conjunction with the room server 218, performs user tracking. At any time instance, the user tracking module 224 outputs the number of people/users in the scene, optionally the general or specific identity of each person/user, the hand positions of each person/user associated with the mobile computing device, and so forth, to the room server 218 which issues commands to the large display 202 or a mobile computing device.

The user tracking 224 allows for the pairing of the mobile computing devices 210, 212, 214 with the users 204, 206, 208. The user tracking module 224 tracks each user 204, 206, 208 by one or more of various tracking techniques such as facial tracking, body tracking or other types of tracking techniques. In some large display interaction implementations, the user tracking module 224 also recognizes the user by using facial recognition techniques, body recognition techniques or other recognition techniques.

The room server 218 issues commands to reconfigure the display 202 when a user 204, 206, 208 is within a prescribed distance from the display at approximately the same time a touch event is received from a mobile computing device 210, 212, 214, using a display command issuance module 246. Additionally, a user interface 234, 236, 238 on a mobile computing device 210, 212, 214 changes to enable different functionality relative to the display based on the distance a given user is from the display.

When there is a touch event (e.g., the user touches his or her mobile device in a prescribed matter or activates an applicable control) on a mobile computing device 210, 212, 214, a mobile event receipt module 230 at the room server 218 receives the event and correlates the event to a particular user 204, 206, 208. A mobile device command issuance module 232 can then issue an appropriate command to the mobile computing device that sent the touch event or to the display 202. For example, the mobile device command issuance module 232 can interpret a particular touch input or gesture of a user and provide the corresponding function and/or instructions to the large display 202. The large display 202 can then implement the corresponding function (such as selecting an object or moving a window) without requiring that the user touch the large display 202 or requiring that the large display 202 has touch capabilities.

In some implementations, using the registration module 224 or by associating a user with a specific mobile device in another manner, the system 200 knows which user's mobile computing device (e.g., tablet, phone) is touched. From the tracking (and optionally recognition information) provided by the user tracking module 224, the room server 218 knows where the user is as well as the user's hand position with respect to the large display 202. In some implementations, the system 200 correlates the registration information with the touch event information that includes the mobile computing device's registered ID which allows the system 200 to know the specific identity of a given user.

When a user 204, 206, 208 is within a prescribed distance from the display 202 (in some implementations about an arm's length), by combining the mobile computing device's 210, 212, 214 touch sensing with the user tracking, touch interactions can be simulated on a non-touch display.

When a person/user 204, 206, 208 is holding a mobile computing device 210, 212, 214, the user tracking module 224 can measure if the user is standing within a prescribed distance away from the large display 202. If so, the user tracking module 224 can obtain the position of the hand that is drawing (e.g., gesturing with respect to the large display) and provide this to the room server 218. The mobile device command issuance module 232 will also issue a command to change the user interface 234, 236, 238 to display capabilities that will allow the user to annotate or otherwise control the display 202. Whenever there is a touch event on the mobile computing device 210, 212, 214, the touch event is sent to the room server 218 and received by the mobile device event receipt module 230. The room server 218 then checks the hand position of the user of the mobile device 210, 212, 214 using user tracking information received from the user tracking module 224. If the hand position is within the prescribed distance from the display 202, in some implementations, the mobile device command issuance module 232 will issue a stroke-drawing command that corresponds with hand gestures the user makes. In this way, the user can write strokes on the display as if the display were touch-sensitive by using gestures of the hand.

The same mechanism can be used to enter text. The user uses his/her mobile computing device to type text or to draw on the screen of their mobile device, and then clicks on a special "copy" button (or other control) on the user interface 232, 234, 236 of the mobile computing device 210, 212, 214. The same text or drawing will show up on the large display 202 at the hand position. For example, when the special "copy" button is clicked, the mobile computing device 210, 212, 214 sends the event together with the text and/or drawing over the wireless network 224 to the room server 218. Similar mechanisms can be used to open a file (such as a photo, document, or video) that is stored on the mobile computing device 210, 212, 214 to be displayed on the large display. The room server 218 obtains the position of the user's hand (e.g., the person with the same ID as the owner of the mobile computing device) using the user tracking module 224. The room server 218 then sends the received text/and or drawing with a command to the large display 202 and the large display 202 displays the text and/or drawing near (e.g., within a prescribed distance from) the hand position of the user 204, 206, 208.

If there are virtual (control) buttons presented on the display 202, and the user 204, 206, 208 is within a prescribed distance from the display (e.g., approximately an arm's length of a user in some embodiments), the user can use their mobile computing device to click on the virtual buttons on the display 202 by moving the mobile computing device over the virtual button and activating a touch event on the mobile device 210, 212, 214. The touch event on the mobile computing device and the position of the hand are combined to trigger the "button click" event on the large display.

When a user 204, 206, 208 is away from the large display 202 (outside of the prescribed distance), the user's mobile computing device 210, 212, 214 can be used as a pointer. In one implementation, a "relative pointing" is used. When a user wishes to point to something shown on the display, the user presses a "point" button (or other similar control) on the user interface of the mobile computing device, and a dot (or other type of cursor) is drawn at the center of the large display. After that, the user keeps pressing the button, and the rotations of the mobile computing device are converted to the relative movements of the "dot" on the display. Finally, when the user releases the button, the dot disappears.

In another implementation, "absolute pointing" is performed. The room server 218 estimates the intended pointing direction from the user's arm and hand positions obtained from the user tracking and recognition module 224. When the user presses the "point" button (or other similar control) on the user interface 234, 236, 238 of the mobile computing device 210, 212, 214, a dot (or other cursor) is drawn at the intersection of the pointing direction with the display 202.

Figure 3:
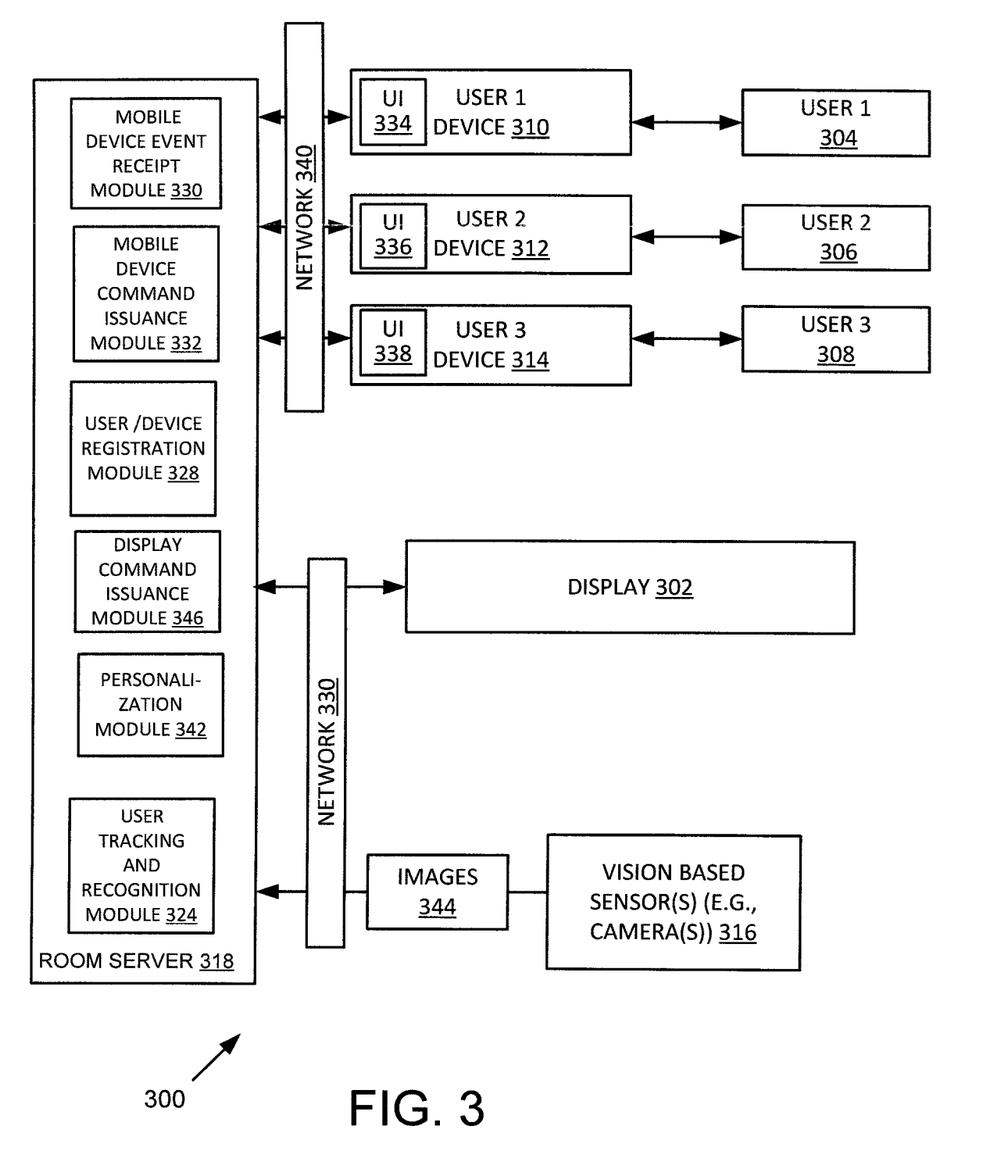
FIG. 3 is another exemplary block diagram of a system for practicing various large display interaction implementations as described herein.

FIG. 3 provides another exemplary system 300 that provides for personalized interactions with a computer-driven display using one or more computing devices. This system 300 operates similarly to the system discussed with respect to FIG. 2 but allows content entered by users 304, 306, 308 to be personalized on the display. This system 300 also employs a room server 318. As shown in FIG. 3, the system 300 further comprises one or more mobile computing devices 310, 312, 314, each mobile computing device being associated with a user 304, 306, 308. The system 300 further includes a display 302 and one or more cameras or vision-based sensors 316 that capture images 344 of the display 302 and the users 304, 306, 308. The system 300 also employs a vision-based user tracking and recognition unit 324 that tracks each user, and recognizes each user's identity using the captured images. The room server 318 is in communication with each mobile computing device 310, 312, 314 via a wireless network 340 (e.g., Blue-tooth, WiFi). The room server/computing device 318 is also in communication with the one or more cameras or vision based sensors 316, the display 302 and the vision-based tracking system 324 (if the vision-based tracking system is not part of the room server 318), either by being directly connected to these devices or by being connected via a wireless or wired network 320.

The computing device/room server 318 issues commands to reconfigure the display 302 when a user 304, 306, 308 is within a prescribed distance from the display at approximately the same time a touch event is received from a mobile computing device 310, 312, 314. Additionally, a user interface 334, 336, 338 on a mobile computing device 310, 312, 314 changes to enable different functionality relative to the display 302 based on the distance a given user is from the display.

The system 300 operates similarly to the system 200 depicted in FIG. 2, and can personalize the information displayed on the display for each user's input. To this end, a user identification unit 328 that obtains the identity of each of one or more mobile computing device users and associates each user's identity with a corresponding mobile computing device is used to determine which user is within the prescribed distance from the display. Since the room server 318 knows the identity of each person/user (e.g., via the registration module 328 or by associating data received from sensors on a mobile computing device to user position), personalized interactions can be enabled. For example, each user 304, 306, 308 can have his or her own stroke colors and thicknesses to display on the display 302. Two people can write on the display at the same time each with a different color. Multiple users 304, 306, 308 can use their mobile computing devices to point to the display 302 simultaneously, each with a different colored dot. If the vision-based user tracking and recognition unit 324 tracks a user's hand to be within a prescribed distance from the display 302, annotations a user gestures relative to the display are shown on the display 302 at the location (e.g., within a prescribed distance) of the user's hand. The annotations can be personalized based on the identity of the user making the annotation by using a user personalization module 342 that personalizes annotations for each user by using a different font, color, stroke width or other distinguishing attribute. These personalizations can be sent from the display issuance module 346 of the room nervier 318 to the display 302.

If the user tracking and recognition unit 324 tracks the user to be within a prescribed distance from the display 302 the content displayed on the user interface 334, 336, 338 on the user's mobile computing device 310, 312, 314 changes to allow the user 304, 306, 308 to enter information on the mobile device 310, 312, 314 which is shown on the display. The user interface 334, 336, 338 shown on a user's mobile computing device 310, 312, 314 also changes when the user 304, 306, 308 moves beyond the prescribed distance.

There can be variations to the systems 200, 300 discussed with respect to FIGS. 1, 2 and 3. For example, an alternative way of identifying a user at the large display is to use near field communication (NFC) technology. For example, a mobile computing device can communicate with the large display by using Bluetooth Low Energy (BLE).

In some implementations the position of the mobile computing device is inferred by the hand position. There are alternative solutions to locate the mobile computing devices, however. For example, some implementations use each mobile computing device to emit audio waves (ideally non-audible by human ears). Using a microphone array on the large display or in a room that contains the large display, sound source location techniques are used to estimate the position of any mobile computing device. Another implementation directly recognizes and locates the mobile computing device from the captured images. In particular, if the mobile computing device emits special light patterns, localizing the device from the images is fairly easy.

2.2 Exemplary Processes

Figure 4:
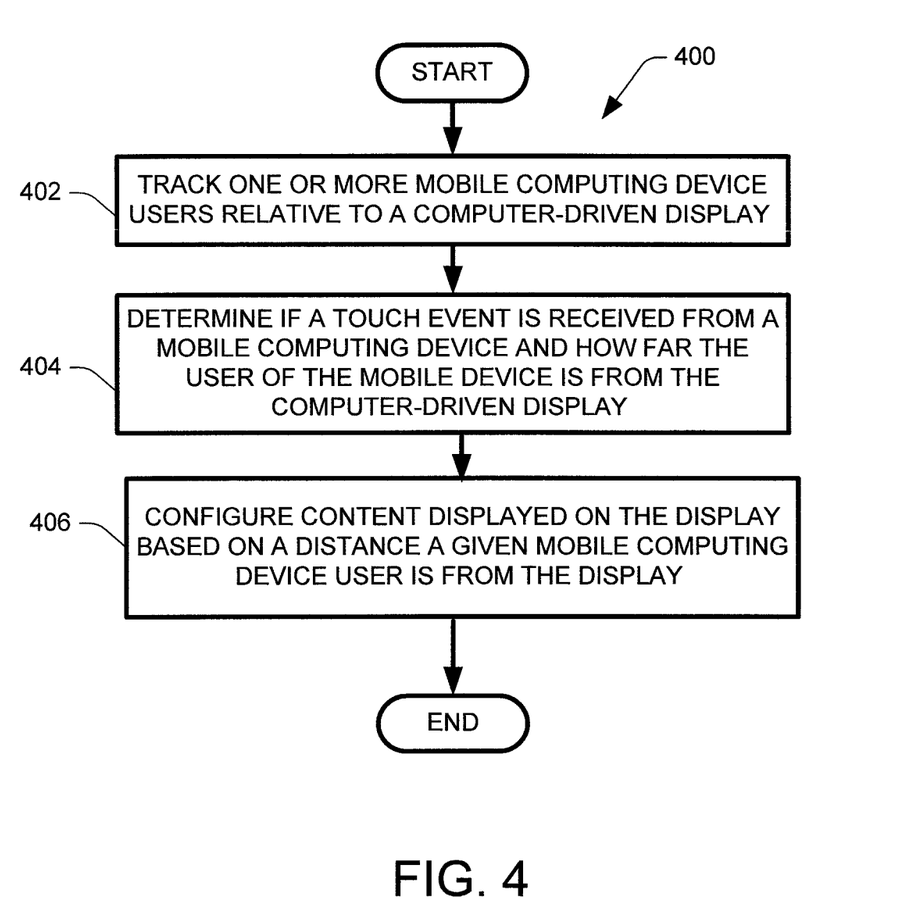
FIG. 4 is an exemplary process for practicing various large display interaction implementations described herein.

FIG. 4 depicts a computer-implemented process 400 for displaying content on a display in accordance with some large display interaction implementations described herein. As shown in block 402, one or more mobile computing device users are tracked relative to a computer-driven display. A determination is made if a touch event is received from a mobile computing device and how far the user of that mobile computing device is from the computer-driven display, as shown in block 404. The content shown on the display is configured based on a distance a given mobile computing device user is from the computer-driven display, as shown in block 406. A user interface displayed on the mobile computing device of the given user also changes based on the distance the given user is from the computer-driven display to allow the user to change the content displayed on the display in different manners based on the distance he or she is from the large display.

Annotations that the given user appears to write on the display are presented on the display if the given user is within a prescribed distance from the display. The position of the given user's hand is used to determine the location of the annotations the given user is writing on the display. For example, when a given user enters text on a mobile computing device while the user is within a prescribed distance from the display (and a specific touch event is received from the given user's mobile computing device) as shown in block 404, the text the user entered on the mobile computing device will be displayed on the computer-driven display (as shown in block 406). Furthermore, if the given user enters drawings or text on the touch screen of a mobile computing device while the user is within a prescribed distance from the computer-driven display (and a specific touch event is received from the given user's mobile computing device) as shown in block 404, this text will also be presented on the computer-driven display (as shown in block 406).

If the given user is greater than a prescribed distance from the display, a pointer is enabled on the display that is controlled by movements of the user's mobile computing device. In one embodiment, the pointer is enabled by changing a user interface on the given user's device to display a control that when activated displays a cursor on the large display that is controlled by the movement of the given user's device. In another embodiment, the cursor position is estimated based on the given user's tracked arm and hand positions.

Multiple users that are within a prescribed distance from the display can change the content of the display simultaneously.

Figure 5:
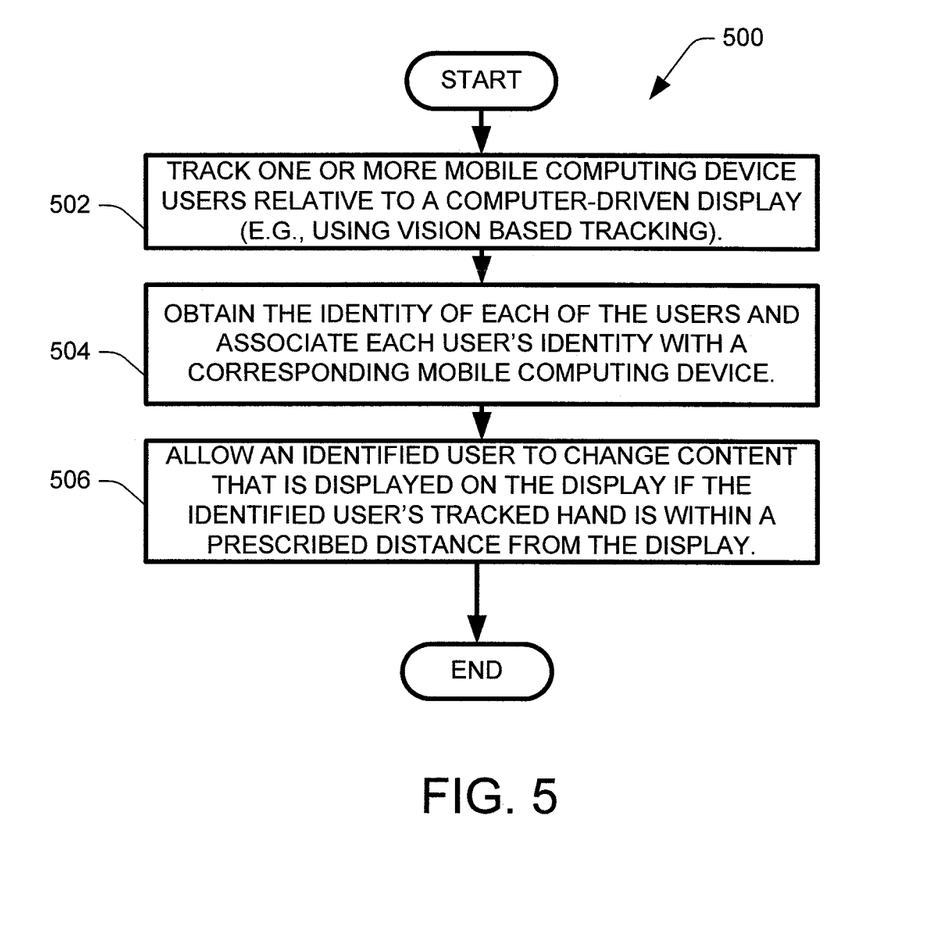
FIG. 5 is another exemplary process for practicing various large display interaction implementations described herein.

FIG. 5 depicts another exemplary computer-implemented process 500 that displays personalized content on a computer-driven display. As shown in block 502, one or more mobile computing device users are tracked relative to the display. The identity of each of the users is obtained (either generally or specifically) and each user's identity is associated with a corresponding mobile computing device, as shown in block 504. An identified user is allowed to change content presented on the display if the tracked user's hand is within a prescribed distance from the display, as shown in block 506. The changed content that is presented on the display can be personalized based on the identity of the identified user that annotates the display. For example, the changed content that is presented on the display can be personalized based on the identity of the identified user that annotates the display to show annotations in a different color, font, stroke width and/or font size from other users of the display.

More than one identified user within the prescribed distance can simultaneously change the content presented on the display by annotating the content on the display, and the annotations will be displayed in different colors, fonts, font sizes, stroke widths or other attributes based on the identity of the user that writes the annotation. Additionally, when one or more users are further than a prescribed distance from the display, they can point to content presented on the display with a unique cursor for each user.

3.0 Other Implementations

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of detailed description of the microphone placement implementation described above.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

The following paragraphs summarize various examples of implementations which may be claimed in the present document. However, it should be understood that the implementations summarized below are not intended to limit the subject matter which may be claimed in view of the foregoing descriptions. Further, any or all of the implementations summarized below may be claimed in any desired combination with some or all of the implementations described throughout the foregoing description and any implementations illustrated in one or more of the figures, and any other implementations described below. In addition, it should be noted that the following implementations are intended to be understood in view of the foregoing description and figures described throughout this document.

Various large display interaction implementations described herein are by means, systems and processes for combining mobile devices with people tracking to enable new interactions including making a non-touch-sensitive display touch-sensitive and allowing personalized interaction with the display.

As a first example, various large display interaction implementations are implemented in a system that provides for interactions with a display. The system includes: a computer-driven display; one or more cameras that capture images of the display and one or more users; a vision-based user tracking unit that tracks each user using the captured images; at least one computing device that is in communication with one or more mobile computing devices, each of which is associated with a user, the one or more cameras, the display and the vision-based tracking system and that issues commands to reconfigure the display when an event is received from a mobile computing device and a user is within a prescribed distance from the computer-driven display.

As a second example, in various implementations, the first example is further modified by means, processes or techniques to further include a user identification unit that obtains the identity of each of one or more mobile computing device users and associates each user's identity with a corresponding mobile computing device to allow the commands issued to the display to be personalized to an identified user.

As a third example, in various implementations, any of the first example and the second example are further modified via means, processes or techniques such that when the tracking unit tracks a user's hand to be within a first prescribed distance from the display, annotations a user gestures relative to the display are displayed on the display within a second prescribed distance of the user's hand on the display.

As a fourth example, in various implementations, any of the first example, the second example and the third example are further modified by means, processes and techniques such that a given mobile computing device is passed from a first user to a second user and the given mobile computing device is associated with the second user.

As a fifth example, in various implementations, any of the first example, the second example, the third example and the fourth example are further modified via means, processes and techniques such that if the tracking and recognition unit tracks the user to be within a prescribed distance from the display the content displayed on the user's mobile phone changes to allow the user to use the mobile device as an input device to enter information to the display.

As a sixth example, in various implementations, any of the first example, the second example, the third example, the fourth example and the fifth example are further modified by means, processes and techniques such that a user interface displayed on a user's mobile computing device changes based on the distance the user is from the display.

As a seventh example, various large display interaction implementations are implemented in a system for displaying personalized content on a computer-driven display. The system includes: one or more computing devices each comprising a processor, communication interface and memory, wherein said computing devices are in communication with each other via a computer network whenever there are multiple computing devices; and a computer program having program modules executable by the one or more computing devices, the one or more computing devices being directed by the program modules of the computer program to track one or more mobile computing device users relative to the display; obtain the identity of each of the users and associate each user's identity with a corresponding mobile computing device; and allow an identified user to change content presented on the display if the tracked user's hand is within a prescribed distance from the display.

As an eighth example, in various implementations, the seventh example is further modified via means, processes or techniques such that the changed content that is presented on the display is personalized based on the identity of the identified user that annotates the display.

As a ninth example, in various implementations, any of the seventh example and the eighth example are further modified via means, processes or techniques such that one or more identified users within the prescribed distance can change the content displayed on the display by annotating the content on the display.

As a tenth example, in various implementations, any of the seventh example, the eighth example and the ninth example are further modified via means, processes or techniques such that when an identified user is greater than the prescribed distance from the display, the user's mobile computing device is used to control a personalized pointer on the display.

As an eleventh example, various large display interaction implementations are implemented in a process for displaying content on a computer-driven display. The process tracks one or more mobile computing device users relative to the display; and configures content presented on the display based on a distance a given mobile computing device user is from the display.

As a twelfth example, in various implementations, the eleventh example is further modified via means, processes and techniques such that a user interface displayed on the mobile computing device of the given user is changed based on the distance the given user is from the display.

As a thirteenth example, in various implementations, any of the eleventh example and the twelfth example are further modified via means, processes and techniques such that annotations that the given user appears to write on the display are displayed on the display if the given user is within a prescribed distance from the display.

As a fourteenth example, in various implementations, any of the eleventh example, the twelfth example and the thirteenth example are further modified via means, processes and techniques such that the position of the given user's hand is used to determine the location of the annotations the given user is writing on the display.

As a fifteenth example, in various implementations, any of the eleventh example, the twelfth example, the thirteenth example and the fourteenth example, are further modified via means, processes and techniques such that text is displayed on the display that the given user enters on the given user's mobile computing device if the given user is within a prescribed distance from the display.

As a sixteenth example, in various implementations, any of the eleventh example, the twelfth example, the thirteenth example, the fourteenth example and the fifteenth example are further modified via means, processes and techniques wherein drawings or text are displayed on the display that the given user enters on a touch screen of the given user's mobile computing device if the given user is within a prescribed distance from the display.

As a seventeenth example, in various implementations, any of the eleventh example, the twelfth example, the thirteenth example, the fourteenth example, the fifteenth example, and the sixteenth example are further modified via means, processes and techniques such that if the given user is at a distance greater than a prescribed distance from the display, a pointer is enabled on the display that the given mobile computing device user controls.

As an eighteenth example, in various implementations, the seventeenth example is further modified via means, processes and techniques such that the pointer is enabled by changing a user interface on the given user's device to display a control that when activated displays a cursor on the large display that is controlled by the movement of the given user's device.

As a nineteenth example, in various implementations, the seventeenth example is further modified via means, processes and techniques such that the pointer is enabled by changing a user interface on the given user's mobile computing device to display a control that when activated displays a cursor on the large display whose position is estimated based on the given user's tracked arm and hand positions.

As a twentieth example, in various implementations, any of the eleventh example, the twelfth example, the thirteenth example, the fourteenth example, the fifteenth example, the sixteenth example, the seventeenth example, the eighteenth example and the nineteenth are further modified via means, processes and techniques such multiple users that are within a prescribed distance from the display can change the content of the display simultaneously.

Figure 6:
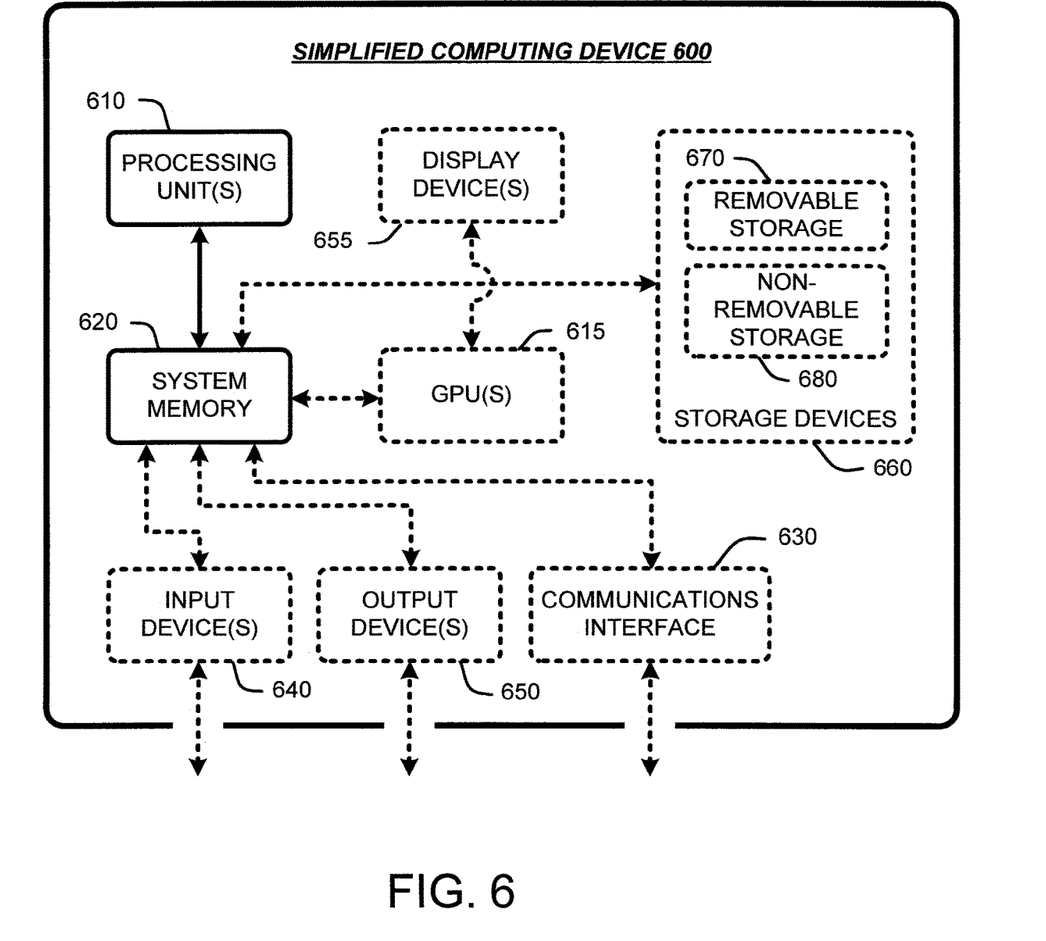
FIG. 6 is an exemplary computing system that can be used to practice exemplary large display interaction implementations described herein.

4.0 Exemplary Operating Environment:

The large display interaction implementations described herein are operational within numerous types of general purpose or special purpose computing system environments or configurations. FIG. 6 illustrates a simplified example of a general-purpose computer system on which various elements of the large display interaction implementations, as described herein, may be implemented. It is noted that any boxes that are represented by broken or dashed lines in the simplified computing device 600 shown in FIG. 6 represent alternate implementations of the simplified computing device. As described below, any or all of these alternate implementations may be used in combination with other alternate implementations that are described throughout this document.

The simplified computing device 600 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to realize the large display interaction implementations described herein, the device should have a sufficient computational capability and system memory to enable basic computational operations. In particular, the computational capability of the simplified computing device 600 shown in FIG. 6 is generally illustrated by one or more processing unit(s) 610, and may also include one or more graphics processing units (GPUs) 615, either or both in communication with system memory 620. Note that that the processing unit(s) 610 of the simplified computing device 600 may be specialized microprocessors (such as a digital signal processor (DSP), a very long instruction word (VLIW) processor, a field-programmable gate array (FPGA), or other micro-controller) or can be conventional central processing units (CPUs) having one or more processing cores and that may also include one or more GPU-based cores or other specific-purpose cores in a multi-core processor.

In addition, the simplified computing device 600 may also include other components, such as, for example, a communications interface 630. The simplified computing device 600 may also include one or more conventional computer input devices 640 (e.g., touch screens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 600 and with any other component or feature of the microphone placement implementation, including input, output, control, feedback, and response to one or more users or other devices or systems associated with the microphone placement implementation, are enabled by a variety of Natural User Interface (NUI) scenarios. The NUI techniques and scenarios enabled by the microphone placement implementation include, but are not limited to, interface technologies that allow one or more users user to interact with the microphone placement implementation in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other input devices 640 or system sensors 605. Such NUI implementations are also enabled by the use of various techniques including, but not limited to, information derived from system sensors 605 or other input devices 640 from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices. Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited to, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the large display interaction implementations.

However, it should be understood that the aforementioned exemplary NUI scenarios may be further augmented by combining the use of artificial constraints or additional signals with any combination of NUI inputs. Such artificial constraints or additional signals may be imposed or generated by input devices 640 such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the large display personalized interaction implementations.

The simplified computing device 600 may also include other optional components such as one or more conventional computer output devices 650 (e.g., display device(s) 655, audio output devices, video output devices, devices for transmitting wired or wireless data transmissions, and the like). Note that typical communications interfaces 630, input devices 640, output devices 650, and storage devices 660 for general-purpose computers are well known to those skilled in the art, and will not be described in detail herein.

The simplified computing device 600 shown in FIG. 6 may also include a variety of computer-readable media. Computer-readable media can be any available media that can be accessed by the computing device 600 via storage devices 660, and include both volatile and nonvolatile media that is either removable 670 and/or non-removable 680, for storage of information such as computer-readable or computer-executable instructions, data structures, program modules, or other data.

Computer-readable media includes computer storage media and communication media. Computer storage media refers to tangible computer-readable or machine-readable media or storage devices such as digital versatile disks (DVDs), blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, program modules, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, and/or computer program products embodying some or all of the various large display personalized interaction implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

The large display interaction implementations described herein may be further described in the general context of computer-executable instructions, such as program modules, being executed by a computing device. Generally, program modules include routines, programs, objects, components, data structures, and the like, that perform particular tasks or implement particular abstract data types. The large display interaction implementations may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so on.

The foregoing description of the large display interaction implementations have been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate implementations may be used in any combination desired to form additional hybrid implementations of the microphone placement implementation. It is intended that the scope of the invention be limited not by this detailed description, but rather by the claims appended hereto. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other equivalent features and acts are intended to be within the scope of the claims.

The invention claimed is:

1. A system for providing for interactions with a display, comprising:
   a computer-driven display;
   one or more cameras that capture images of a plurality of users of one or more mobile computing devices;
   a vision-based user tracking unit configured to track each user, using the captured images; and for each user of the plurality of users:
      infer a general identity for the user based on the captured images, wherein the general identity is a generalized anonymous identity that may be used to distinguish the user from other users of the plurality of users without requiring the user to explicitly pre-register a specific, personalized identity for the user; and
      correlate the general identity for the user to a mobile computing device of the one or more mobile computing devices, such correlation being performed automatically without requiring the user to explicitly register any identity with the mobile computing device; and
   a computing device that is in communication with the one or more mobile computing devices, the one or more cameras, the computer-driven display and the vision-based tracking unit and that issues commands to reconfigure the computer-driven display based on a user being within a prescribed distance from the computer-driven display, and when an event is received from a mobile computing device correlated to the general identity for the user.

2. The system of claim 1, further comprising:
   a user identification unit that obtains one or more of a general identity and a previously defined identity of each of one or more mobile computing device users and associates each user's general or previously defined identity with a corresponding mobile computing device to allow the commands issued to the display to be personalized to an identified user based on personalization settings associated with the general or previously defined identity.

3. The system of claim 1, wherein when the tracking unit tracks a user's hand to be within a prescribed distance from the display, annotations corresponding to user gestures relative to the display are presented on the display at a position relative to a location of the user gestures.

4. The system of claim 1, wherein a given mobile computing device is passed from a first user to a second user and the given mobile computing device is associated with the second user.

5. The system of claim 1, wherein if the tracking unit tracks the user to be within a prescribed distance from the display, the content displayed on the mobile computing device correlated with the general identity for the user changes to allow the user to use said mobile device as an input device to enter information to the display.

6. The system of claim 1, wherein a user interface displayed on a user's mobile computing device changes based on the distance the user is from the display.

7. A system for displaying personalized content on a computer-driven non-touch sensitive display, comprising:
   one or more computing devices each comprising a processor, communication interface and memory, wherein said computing devices are in communication with each other via a computer network whenever there are multiple computing devices; and
   a computer program having program modules executable by the one or more computing devices, the one or more computing devices being directed by the program modules of the computer program to,
      track a plurality of mobile computing device users relative to the non-touch sensitive display;
      infer a general identity for each of the users based on captured images of the users, wherein the general identity for a user is a generalized anonymous identity that may be used to distinguish the user from other users of the plurality of users without requiring the user to explicitly pre-register a specific, personalized identity for the user;
      correlate each user's general identity to a corresponding mobile computing device, such correlation being performed automatically without requiring the user to explicitly register any identity with the mobile computing device; and
      allow a provisionally identified user having a general identity to change content presented on the non-touch sensitive display if the provisionally identified user's hand is within a prescribed distance from the display when an event is received from a mobile computing device correlated to the general identity for the user.

8. The system of claim 7, wherein the changed content that is presented on the non-touch sensitive display is personalized based on a general or previously defined identity of the identified user that annotates the display.

9. The system of claim 8, wherein one or more identified users within the prescribed distance can change the content displayed on the non-touch sensitive display by annotating the content on the display.

10. The system of claim 9, wherein when an identified user is greater than the prescribed distance from the display, the user's mobile computing device is used to control a personalized pointer on the non-touch sensitive display.

11. A computer-implemented process for displaying content on a computer-driven large display, comprising:
    tracking a plurality of mobile computing device users relative to the large display, wherein tracking a user of the plurality of mobile computing device users includes:
        inferring a general identity for the user based on captured images of the plurality of mobile computing device users, wherein the general identity is a generalized anonymous identity that may be used to distinguish the user from other users of the plurality of users without requiring the user to explicitly pre-register a specific, personalized identity for the user; and
        correlating the user's general identity to a corresponding mobile computing device, such correlation being performed automatically without requiring the user to explicitly register any identity with the mobile computing device; and
    configuring content presented on the display based on an event being received from the mobile computing device correlated to a general identity for a given mobile computing device user responsive to the mobile computing device user being at a prescribed distance from the large display when an event is received from a mobile computing device correlated to the general identity for the mobile computing device user.

12. The computer-implemented process of claim 11, further comprising changing a user interface displayed on the mobile computing device of the given user based on the distance the given user is from the large display.

13. The computer-implemented process of claim 11, further comprising displaying annotations that the given user appears to write on the display if the given user is within a prescribed distance from the large display.

14. The computer-implemented process of claim 13, wherein the position of the given user's hand is used to determine the location of the annotations the given user is writing on the large display.

15. The computer-implemented process of claim 11, further comprising displaying text or drawings on the large display that the given user enters on the given user's mobile computing device if the given user is within a prescribed distance from the large display.

16. The computer-implemented process of claim 11, further comprising:
    if the given user is at a distance greater than a prescribed distance from the large display, enabling a pointer on the large display that the given mobile computing device user controls.

17. The computer-implemented process of claim 16, wherein the pointer is enabled by changing a user interface on the given user's device to display a control that when activated displays a cursor on the large display that is controlled by the movement of the given user's device.

18. The computer-implemented process of claim 16, wherein the pointer is enabled by changing a user interface on the given user's mobile computing device to display a control that when activated displays a cursor on the large display whose position is estimated based on the given user's tracked arm and hand positions.

19. The computer-implemented process of claim 11, wherein multiple users that are within a prescribed distance from the large display can change the content of the large display simultaneously.

20. The system of claim 1, wherein for at least one of the users for whom a general identity was determined, that user is not pre-registered with the system.

21. The system of claim 1, wherein the commands to reconfigure the computer-driven display based on the user being within a prescribed distance from the computer-driven display and when the event is received are configured to perform a first operation when the user is within the prescribed distance and to perform a second, different operation when the user is not within the prescribed distance.

22. A computer-implemented process for displaying content on a computer-driven display, comprising:
    tracking a plurality of mobile computing device users relative to the display, wherein tracking a user of the plurality of mobile computing device users includes:
        inferring a general identity for the user based on captured images of the plurality of mobile computing device users, wherein the general identity is a generalized anonymous identity that may be used to distinguish the user from other users of the plurality of users without requiring pre-registration of a specific, personalized identity for the user; and
        correlating the user's general identity to a corresponding mobile computing device; and
    configuring content presented on the display based on an event being received from the mobile computing device correlated to a general identity for a given mobile computing device user responsive to an event being received from a mobile computing device correlated to the general identity for the mobile computing device user.

* * * * *